United States Patent [19]

Adamson et al.

[11] 4,378,275

[45] Mar. 29, 1983

[54] METAL SULPHIDE EXTRACTION

[75] Inventors: David V. Adamson; David Naden, both of Cleveland, England

[73] Assignee: Saudi-Sudanese Red Sea Joint Commission, Jeddah, Saudi Arabia

[21] Appl. No.: 327,054

[22] Filed: Dec. 3, 1981

[51] Int. Cl.³ .......................... C25C 1/16; C22B 3/00; C22B 11/00; C22B 13/00

[52] U.S. Cl. ..................................... 204/119; 204/114; 75/101 BE; 75/114; 75/118 R; 75/119; 75/120; 75/121; 75/107

[58] Field of Search ............................... 204/119, 114; 75/101 BE, 114, 118 R, 119, 120, 121, 107

[56] References Cited

U.S. PATENT DOCUMENTS

| | | | |
|---|---|---|---|
| 3,510,414 | 5/1970 | Orlandini et al. | 204/119 |
| 3,929,598 | 12/1975 | Stern et al. | 204/119 |
| 3,958,986 | 5/1976 | Thorsen | 75/101 BE |
| 3,989,607 | 11/1976 | Bush et al. | 204/110 |
| 4,004,991 | 1/1977 | Veltman | 204/119 |
| 4,196,076 | 4/1980 | Fujimoto et al. | 75/101 BE |
| 4,288,304 | 9/1981 | De Marthe et al. | 204/119 |

*Primary Examiner*—R. L. Andrews
*Attorney, Agent, or Firm*—Bernard, Rothwell & Brown

[57] ABSTRACT

A process is described for recovering non-ferrous metal values from a metal-containing sulphide material containing at least one non-ferrous metal selected from zinc, copper, lead, cobalt, nickel, silver and gold, as well as iron, comprising leaching the complex sulphide material under oxidizing conditions in a leach stage with an acidic aqueous chloride lixiviant solution containing magnesium chloride, thereby to solubilize non-ferrous metal values in the material and to leave a residue comprising iron in oxide or hydrated oxide form and also sulphur, passing resulting non-ferrous metal-containing leach liquor to a metal recovery section including a solvent extraction stage in which non-ferrous metal values are recovered by liquid-liquid extraction using a hydrophobic organic extractant phase containing a cationic transport agent for non-ferrous metal transport, recovering from the solvent extraction stage an aqueous magnesium chloride-containing raffinate, subjecting a portion of the aqueous magnesium chloride-containing raffinate from the solvent extraction stage to high temperature hydrolysis, thereby liberating hydrogen chloride and magnesium oxide, recycling another portion of the aqueous magnesium chloride containing raffinate to the leach stage, recycling liberated hydrogen chloride to the leach stage, and passing magnesium oxide formed in the high temperature hydrolysis to the solvent extraction stage for use as neutralizing agent for the cationic transport agent.

31 Claims, 1 Drawing Figure

METAL SULPHIDE EXTRACTION

This invention relates to a process for the recovery of metal values from a metal-containing sulphide material containing at least one non-ferrous metal selected from zinc, copper, silver, gold, lead, cobalt, and nickel, in addition to iron.

Complex metal sulphides are found in many parts of the world. Although some of these ores are emenable to pyrometallurgical techniques, the use of pyrometallurgal processes can only be considered if the sale of sulphuric acid is economically feasible. However, no single process will successfully treat multi-metal concentrates and expensive multi-smelter complexes are necessary, which are difficult to justify at prevailing metal prices, particularly for relatively small deposits that are frequently found. In addition, pyrometallurgical processes suffer from environmental drawbacks and expensive precautions must be taken to avoid atmospheric pollution through emission of dust and/or sulphur dioxide and/or trioxide.

Hydrometallurgical processes have assumed greater importance in recent years, particularly in areas in which the sale of sulphuric acid is not possible and where it is becoming increasingly difficult to meet environmental standards.

Typically, complex sulphide ores are intricate associations of chalcopyrite ($CuFeS_2$), galena (PbS), sphalerite (ZnS) and pyrite ($FeS_2$) or pyrrhotite ($Fe_{1-x}S$). These represent important resources of non-ferrous and precious metals. Because of their mineralogical associations and the texture of the rock that makes up the ore itself, they present specific and difficult problems during most stages of their overall beneficiation, from mineral processing to extractive metallurgy.

Usually complex sulphide ores that are used as sources of non-ferrous and precious metals contain about 5% or more of non-ferrous metals. Of the non-ferrous metals those that are present in significant proportions tend to be zinc, followed by lead and then by copper. Typical compositions usually fall in the following ranges: Cu, 0.1–3%; Pb, 0.3–3%; Zn, 0.2–10%; S, 20–50%; Ag, 30–100 g/t; and Au, 0–10 g/t.

A review of processing options from complex sulphide ores to metals is given in a paper by G. Barbery et al at pages 135 to 150 of the Collected Papers of the Complex Sulphide Ores Conference, held in Rome, Oct. 5 to 9 1980, and organised by Institute of Mining and Metallurgy, in association with Consiglio Nazionale delle Ricerche Instituto per il Trattamento dei Minerali.

Another potential source of non-ferrous metals is the complex metal sulphide material that is found as a mud on the sea floor in certain parts of the world, such as parts of the Red Sea. Such muds are effectively rocks at an early stage of their formation.

There have been a variety of proposals for leaching complex metal sulphide materials with chloride-containing lixiviants. Such leaching processes usually rely on the presence of a transition metal cation in the circulating lixiviant solution which participates in the leaching process and changes velency during the course of leaching. For example two stage leaching of chalcopyrite and other copper-containing materials by ferric chloride oxidation thereof to produce cupric chloride, reduction of the cupric chloride to cuprous chloride, recovery of metallic copper by electrolysis, and regeneration of ferric chloride by oxidation with concurrent purge of iron is described in U.S. Pat. Nos. 3,785,944 and 3,879,272. Cupric chloride leaching of sulphur- and zinc-containing ores or concentrates for the recovery of zinc therefrom is described in British Patent Specification No. 1,502,404.

The aqueous oxidation of complex sulphide concentrates in hydrochloric acid is described in a paper by T. Mizoguchi and F. Habashi, International Journal of Mineral Processing, 8 (1981), pages 177 to 193. This describes decomposition of complex sulphides containing sphalerite, galena, chalcopyrite, and small amounts of silver in a matrix of pyrite at 120° C. and at an oxygen pressure of 1000 kPa in 1–2 N HCl for 90 minutes. It is reported that over 97% of the zinc and over 95% of the copper goes into solution whilst about 83% of the lead remains in the residue as $PbCl_2$ and $PbSO_4$ and 85% of the silver, together with most of the pyrite. Recovery of elemental sulphur is said to be nearly 100% with respect to ZnS, PbS, and $CuFeS_2$.

Leaching of McArthur River zinc-lead sulphide concentrate with hydrochloric acid in oxygen has been described in a paper by David M. Muir et al in Proc. Australas. Inst. Min. Metall No. 259, September 1976, pages 23 to 35. That same paper also illustrates in FIG. 8 on page 33 a zinc recovery process for recovering zinc from a zinc chloride aqueous feed solution which is itself derived from an amine strip step. However, this zinc recovery process is said to suffer from the problem of contamination of the electrolyte solution with chloride ion. The overall integrated process recommended by Muir et al for leaching McArthur River concentrate is illustrated in FIG. 9 and involves leaching of zinc concentrate with oxygen and HCl in the presence of cupric ions at atmospheric pressure with separate leaching of lead using chlorine gas and water. The resulting crude zinc chloride leach liquor is subjected to cementation, pH adjustment, evaporation and zinc chloride electrolysis, the chlorine liberated in the electrolysis step being recycled for use in the chlorine/water lead leaching step.

Although there are a number of plants operating in the world today utilising zinc chloride electrolysis, the favoured method is zinc sulphate electrolysis.

It is an object of the present invention to provide a process for recovery of metal values from complex metal sulphide materials which utilises a single leach step and which enables the proven technology of zinc sulphate electrolysis to be used for recovery of zinc from the resulting leach liquor. It is a further object of the invention to provide a process for recovery of non-ferrous metal values from a metal containing sulphide material in which the sulphide content is recovered as elemental sulphur.

According to the present invention there is provided a process for recovering non-ferrous metal values from a metal-containing sulphide material containing at least one non-ferrous metal selected from zinc, copper, lead, cobalt, nickel, silver and gold, as well as iron, comprising leaching the complex sulphide material under oxidising conditions in a leach stage with an acidic aqueous chloride lixiviant solution containing magnesium chloride, thereby to solubilise non-ferrous metal values in the material and to leave a residue comprising iron in oxide or hydrated oxide form and also sulphur, passing resulting non-ferrous metal-containing leach liquor to a metal recovery section including a solvent extraction stage in which non-ferrous metal values are recovered by liquid-liquid extraction using a hydophobic organic extractant phase containing a cationic transport agent for non-ferrous metal transport, recovering from the solvent extraction stage an aqueous magnesium chloride-containing raffinate, subjecting a portion of the aqueous magnesium chloride-containing raffinate from the solvent extraction stage to high temperature hydrolysis, thereby liberating hydrogen chloride and magnesium oxide, recycling another portion of the aqueous magnesium chloride containing raffinate to the leach stage, recycling liberated hydrogen chloride to the leach stage, and passing magnesium oxide formed in the high temperature hydrolysis to the solvent extraction stage for use as neutralising agent for the cationic transport agent.

The metal-containing sulphide material may be any of the complex metal sulphides described above. Complex metal sulphide ores should be finely comminuted prior to leaching. Complex sulphide muds are preferably de-watered at least in part prior to leaching, e.g. down to a solids content of about 50% w/v.

The use of elevated temperatures is preferred in the leach stage. Preferably the temperature is at least about 50° C. to about 250° C., temperatures in the range of from about 100° C. to about 180° C. being especially preferred.

Leaching is conducted under oxidative conditions. Such oxidative conditions may comprise the use of molecular oxygen in the form of air, oxygen-enriched air or pure oxygen. The use of pure oxygen is preferred. Although leaching at atmospheric pressure is possible, it is preferred to operate the leach stage under elevated partial pressures of molecular oxygen, for example, oxygen partial pressures in the range of from about 50 psig to about 250 psig (about 345 kPag to about 1725 kPag). The partial pressure of oxygen should be selected in relation to the operating temperature in the leach stage so as to exceed the vapour pressure of the solution.

The aqueous chloride lixiviant solution contains, in addition to magnesium chloride, hydrochloric acid substantially equivalent to the non-ferrous content of the complex metal sulphide material being leached. It may further contain one or more other soluble chlorides, e.g. zinc chloride, sodium chloride, potassium chloride, or mixtures thereof, without harm. When working with muds from the sea bottom, e.g. a complex metal sulphide mud from the sea bottom of the Red Sea, sodium chloride and other soluble chlorides can enter the system in the sea water associated with the partially dewatered mud.

The total chloride ion concentration in the aqueous chloride lixiviant solution supplied to the leach stage is preferably in excess of about 2 grams ions per liter. The upper limit of chloride ion concentration is not particularly critical but will not be so high as to cause precipitation of metal chlorides. Usually the chloride ion concentration will be in the range of from about 4 up to about 10 grams ions per liter or up to the solubility limit of chloride ions in the leach liquor under the operating conditions selected, whichever is the lower. Typically the chloride ion concentration is from about 4 to about 6 gram ions per liter, e.g. about 5 gram ions per liter.

The lixiviant solution is acidic. The source of acidity is hydrochloric acid derived from hydrogen chloride produced in the high temperature hydrolysis step. Desirably the amount of hydrogen chloride recycled to the oxidative leach stage corresponds approximately to the stoichiometric quantity required for leaching the non-ferrous metal content of the complex sulphide material being leached. The pH of the solution leaving the leach stage should be about 0.5 or above, e.g. about 0.5 to about 2.5; metal recovery in the downstream metal recovery section is thereby facilitated.

In the oxidative leach step of the process of the invention the major reaction can be summarised as follows:

$$MS + 2HCl + \tfrac{1}{2}O_2 = MCl_2 + H_2O + S.$$

In the above equation M represents non-ferrous metal; in the case of muds from the ocean bed, e.g. from the bottom of the Red Sea, M represents mainly copper, zinc, and iron. The ore may further include minor amounts of other leachable non-ferrous metals including nickel, cadmium, silver, gold, lead and cobalt. Of these non-ferrous metals copper and zinc provide the major proportion, with the other metals being present in minor amounts.

The amount of HCl supplied to the leach stage can be determined by calculating the stoichiometric requirement of leachable non-ferrous metal content, for example the copper and zinc, e.g. as follows:

$$ZnS + 2HCl + \tfrac{1}{2}O_2 = ZnCl_2 + H_2O + S;$$

$$CuS + 2HCl + \tfrac{1}{2}O_2 = CuCl_2 + H_2O + S.$$

In the oxidative leach step of the process of the invention iron sulphide is completely oxidised and solubilised as ferric chloride which is then reprecipitated as ferric hydroxide and jarosite. Some oxidation of sulphur to sulphate may occur in the course of the oxidative leach step. The precise mechanism for sulphate formation is unknown but it is suspected that the overall rection is:

$$6\,CuCl_2 + S + 4H_2O = 6\,CuCl + H_2SO_4 + 6HCl.$$

The cuprous chloride is oxidised quickly with small traces of oxygen to cupric chloride according to the following equation, it is postulated:

$$6\,CuCl + 1\tfrac{1}{2}O_2 + 6HCl = 6\,CuCl_2 + 3H_2O$$

Alternatively the sulphate ion may be produced by direct oxidation of a metal sulphide, e.g.:

$$MS + 2O_2 = MSO_4$$

In the presence of sulphate ions and of suitable cations, such as sodium ions, a jarosite may be precipitated according to the following reaction in the leach stage:

$$NaCl + 3FeCl_3 + 2\,MgSO_4 + 6H_2O = NaFe_3(SO_4)_2(OH)_6 + 2\,MgCl_2 + 6\,HCl.$$

Once this jarosite equilibrium has been established other iron oxides, mainly ferric hydroxide, are precipitated according to the following equation:

$$12\,FeCl_2 + 3O_2 + 2H_2O = 8\,FeCl_3 + 4\,FeOOH.$$

The period required for leaching may vary within wide limits, e.g. from about 5 minutes to about 12 hours or more. Usually it will be preferred to conduct leaching for a period in the range of from about 15 minutes to about 90 minutes, e.g. about 30 minutes.

In the course of experimental work leading up to the present invention it has been observed that oxidation of sulphur to sulphate tends to occur to an increasing extent if high temperatures and high oxygen pressures are used and if extended leaching times are used. It would also appear that control of pH in the oxidative leach step to between about 0.1 and about 1.0, preferably between about 0.3 and about 0.8, e.g. to about 0.5, tends to minimise sulphate formation. Hence careful pH control during leaching is desirable, as are also the selection of minimum temperatures, pressures and leaching times consistent with the desired recovery of non-ferrous metals, if sulphate formation is to be minimised.

Leaching can be carried out in the process of the invention on a batch basis but is preferably conducted on a continuous basis.

From the leach stage there are recovered a residue comprising mainly sulphur, ferric hydroxide (and possibly also a minor amount of jarosite), and a leach liquor containing, in addition to magnesium chloride, at least one non-ferrous metal chloride, the non-ferrous metal being selected from zinc, copper, lead, cobalt, nickel, silver and gold. Due to the presence of excess chloride ions in the lixiviant solution, such non-ferrous metal chlorides are solubilised as their complex anions e.g. $ZnCl_4''$, $CuCl_4''$, $PbCl_4''$, $CoCl_5''$, $NiCl_4''$, $AgCl_3''$ and $AuCl_5''$.

The mixture of leach liquor and insoluble residue from the oxidative leach stage will usually be recovered therefrom as a slurry which is then filtered, possibly with an initial thickening stage. The filter cake is desirably washed in one or more stages to recover adhering non-ferrous metal solution and to minimise loss of chlorides from the system. The washings are desirably recycled to the oxidative leach stage. The residue is passed on for disposal.

The leach liquor is passed on to a metal recovery section. This includes a liquid-liquid extraction stage for recovery of the non-ferrous metal, or at least one of the non-ferrous metals, present. Typically the solvent extraction stage comprises a zinc recovery stage.

Prior to passage to the solvent extraction stage, the liquor will usually first be subjected to a cementation stage for the recovery of one or more of the non-ferrous metals, copper, silver, gold, nickel, cadmium, lead and cobalt. Cementation may be conducted by adding to the leach liquor a cementation agent, such as zinc dust. Cementation may be effected in one or more stages. Preferably the cementation agent is added in excess of the stoichiometric amount required to precipitate the desired non-metal content, e.g. copper, silver, gold etc.

In the cementation stage the metal added as cementation agent replaces any metal present in solution that is below it in the electrochemical series. Such reactions can be exemplified by cementation of copper by zinc according to the following equation:

$CuCl_2 + Zn = ZnCl_2 + Cu.$

When using zinc dust as the cementation agent for treating the leach liquor from the oxidative leach step of the process of the present invention performed upon a mud from the ocean bed, more particularly a mud from the bottom of the Red Sea, it has been found desirable to effect cementation in at least two stages. In this way the nobel non-ferrous metals (e.g. Au, Ag, Pt and Cu) can be recovered separately from the less noble non-ferrous metals (e.g. Pb, Cd, Ni, Co, etc.). Subsequent cementation stages can be used to eliminate impurities from the solution which would otherwise tend to be co-extracted with zinc in the subsequent solvent extraction stage, to pass to the zinc electro-winning step, and possibly to interfere therewith.

In one preferred process according to the invention the nobel non-ferrous metals are precipitated and removed from the leach liquor in one or more cementation stages, e.g. in two cementation stages, and then the less noble non-ferrous metals are removed and recovered in one or more polishing, cementation stages. In the noble non-ferrous metal cementation stage or stages it is preferred to use from about 1 to about 2 times the stoichiometric amount of zinc dust required for cementation, e.g. about 1.5 times the stoichiometric amount. In the polishing stages of cementation it is desirable to use in excess of twice the stoichiometric requirement for all non-zinc metal ions, e.g. up to about 5 times the stoichiometric requirement, more particularly about 2.5 times the stoichiometric requirement for all non-zinc metal ions. Preferably the particle size of the zinc dust used in second and any subsequent cementation stage is finer than that used in the first stage.

Cementation is conducted at atmospheric pressure and is effected at normal or elevated temperatures, e.g. in the range of from about 30° C. up to about 100° C. or more. Prior to cementation any lead chloride that precipitates due to cooling the leach liquor is separated by filtration or centrifugation. The cementation stages can be operated at different temperatures, for example the noble non-ferrous metal cementation stage or stages can be operated at temperatures of up to about 50° C., e.g. at a temperature of about 40° C., and the second or any subsequent cementation stage to recover less noble non-ferrous metals at higher temperatures, e.g. at a temperature of about 80° C. The residence time of the liquor in the cementation stage may vary within wide limits, e.g. from about 5 minutes up to about 90 minutes or more. Usually it will suffice to use a residence time of about 30 minutes in the or each cementation stage.

Addition of excess cementation agent, above the stoichiometric amount required to precipitate the non-zinc non-ferrous metals present results in increase of pH. Desirably the amount of cementation agent added is controlled so that the pH does not rise above about 4.0. The composition of the cementate formed depends to some extent upon the pH of the solution and it has been found desirable to control the pH of the feed liquor supplied to the, or to the first, cementation stage in the range of from about 0.5 to about 1.0 in order to recover a noble non-ferrous metal product that is substantially uncontaminated by less noble non-ferrous metals. For example, it is been found that a low pH's, e.g. of the order of about 0.5 to about 1.0, the silver and gold content of the cementate is high but copper recovery is low. If pH during cementation is allowed to rise higher than about 1.0, copper recovery tends to improve but the silver content of the cementate drops. Advantage of this pH dependence can be taken by conducting the noble non-ferrous metal cementation in two or more stages and recovering cementates of different composition. Usually, however, it will be preferred to select cementation conditions in the first cementation step which result in high silver and copper recovery with minimum precipitation of other non-ferrous metals, these other non-ferrous metals (e.g. Co, Ni, Cd, Pb etc) being recovered in a second or polishing cementation step. If desired, antimony oxide or arsenic oxide can be added as catalyst in the second or in any polishing cementation step. In any polishing cementation step the pH is desirably controlled to lie below about 4.0 so as to remove and recover from the liquor the less noble metals, other than iron (e.g. Pb, Cd, Ni, Co, etc.). Iron can be purged from the solution in a final cementation stage by adding a sufficient quantity of zinc dust is cementation agent, for example about 2.5 times the stoichiometric amount of zinc dust required theoretically to precipitate the iron content of the liquor, whilst controlling the pH of the solution at about 4.5 or higher.

Alternatively the more noble non-ferrous metals, silver and gold, may be selectively recovered prior to cementation, by absorption onto active carbon and the subsequent cementation stages may be used to recover the remaining non-ferrous metals as described above.

Following cementation the resulting slurry is filtered off possibly following a thickening stage. The clear liquor from the cementation stage may still contain iron and is then passed on to an iron purge stage. In one preferred form of process iron removal is effected by a procedure in which residual iron is precipitated by oxidation of any ferrous ions present to the ferric state together with addition of a suitable alkali, e.g. magnesium oxide, magnesium hydroxide, magnesium carbonate, dolomite, calcium hydroxide, quick lime or limestone. Use of a calcium-containing alkali material in the iron purge stage has the additional advantage that precipitation of sulphate as calcium sulphate occurs, which assists in controlling the sulphate ion concentration in the circulating liquor. Such sulphate ions may arise through sulphur oxidation in the oxidative leach stage.

Oxidation of ferrous to ferric ions in the iron purge stage can be achieved by use of atmospheric oxygen or preferably, of pure oxygen, preferably under pressure and at elevated temperature. Typical reaction conditions include use of oxygen partial pressures in the range of from about 30 psig to 250 psig (about 207 kPag to about 1725 kPag) and of temperatures in the range of from about 50° C. to about 250° C.; the temperature and pressure combination should be selected so that the oxygen partial pressure exceeds the vapour pressure of the solution. If desired a flocculant can be added to the resulting pulp to facilitate settlement of iron hydroxide. The residence time of the liquor in the iron purge stage may vary within wide limits, e.g. from about 5 minutes up to about 12 hours or more. Conveniently, however, the residence time is from about 30 minutes up to about 2 hours. In the iron purge stage the pH of the solution is preferably in excess of about 1.5, e.g. in the range of from about 1.5 to about 4.0. After filtration of the pulp resulting from the iron purge step, possibly preceded by a thickening stage, the solids materials are conveniently combined with the residue from the oxidation leach stage prior to washing thereof.

Another method of purging iron from the liquor, prior to passage to the zinc solvent extraction stage, involves oxidation of any ferrous ions present to the ferric state, followed by selective solvent extraction with a cationic extractant, such as di-2-ethylhexylphosphoric acid, supplied in the stoichiometric amount. Ferric irons are usually selectively extracted in preference to zinc. By utilising a limited quantity of cationic extractant the solution passed forward to zinc extraction is thus rendered essentially iron free.

The liquor from the iron purge stage now contains, in addition to magnesium chloride and other soluble chloride such as sodium chloride, predominantly zinc chloride. This is then subjected to a solvent extraction stage using a cationic transport agent for zinc. Such cationic transport agents are organic compounds which are soluble in organic hydrophobic solvents, such as kerosene, and are capable of forming organic-soluble complexes with cationic species. Examples of cationic zinc transport agents include high molecular weight carboxylic acids, for example those containing more than 8 carbon atoms, halogenated fatty acids and alkyl-substituted phosphoric acids. A convenient cationic zinc transport agent is di-2-ethylhexylphosphoric acid.

The organic hydrophobic extractant phase contains in addition to the zinc transport agent a solvent which acts as a carrier for the transport agent and reduces the viscosity of the organic phase. Typical solvents include hydrocarbons or distilled petroleum fractions of the kerosene type or of a similar nature. In addition a modifier solvent can be added to the organic phase with a view to facilitating phase separation during extraction. Such a modifier can be, for example, an aliphatic alcohol containing from about 8 to about 14 carbon atoms or an alkyl phosphate ester. Typically the modifier is isodecanol.

Taking, for example, the use of di-2-ethylhexylphosphoric acid as zinc transport agent, the extraction of zinc proceeds according to the following reaction:

where X is the di-2-ethylhexylphosphate ion. The exchanged hydrogen suppresses the reaction and must be removed if the reaction is to go to completion. This is carried out by the addition of magnesium oxide produced in the high temperature hydrolysis step. Reaction of magnesium oxide with di-2-ethylhexylphosphoric acid can be carried out prior to contact of the organic extractant phase with the aqueous feed liquor. In this case the extraction of zinc proceeds in two stages as follows:

Alternatively magnesia can be added as a slurry to the aqueous phase during zinc extraction, or between stages, as follows:

The result is the same in each case, the extraction being carried out with little or no pH change. Extraction accordingly proceeds to completion and magnesium chloride is regenerated.

In the solvent extraction step the zinc chloride liquor to be extracted preferably has a pH in the range of from about 1.5 to about 4.0, more preferably in the range of from about 1.8 to about 2.5, e.g. about 2.0.

The zinc-loaded organic extractant phase is then washed, using a solution maintained at a pH in the range of from about 2.5 to about 3.5. e.g. about 3.0, by addition of acid, to remove alkali metal and alkaline earth metal ions and transition metal impurity ions, which have survived the cementation and iron purge stages and which may be present in the feed solution to the solvent extraction stage. Such transition metal ions, if passed to the zinc electrowinning stage even in trace amounts, could interefere with zinc electrowinning. Finally the organic phase is washed with water to remove chloride ions and is then passed to a zinc strip stage. In this strip stage the organic phase is contacted with a solution containing sulphuric acid. Conveniently the strip solution is spent electrolyte solution from a subsequent electrolysis step. The resulting zinc-loaded strip solution can then be passed forward to electrolysis according to conventional practice.

The stripped organic phase can then be recycled to the extraction stage, possibly following a washing stage using hydrochloric acid to strip iron from the organic extractant phase.

The aqueous raffinate from the solvent extraction stage contains, in addition, to trace amounts of zinc chloride, predominantly magnesium chloride and sodium chloride. Part of this is recycled to the oxidation leach stage. Another part is subjected to high temperature hydrolysis at temperatures of, for example, from about 400° C. to about 900° C., thereby to generate hydrogen chloride and magnesium oxide. If the raffinate contains appreciable quantities of sodium salts it is best not to exceed a temperature of about 800° C. in the high temperature hydrolysis stage so as to avoid fusion of the sodium salts. Typically high temperature hydrolysis is carried out in a spray roasting stage. The proportion of the raffinate passed to the spray roasting stage is desirably selected to produce the quantity of hydrogen chloride to be supplied to the oxidation leach stage and the equivalent amount of magnesium oxide which is required for neutralisation of the di-2-ethylhexylphosphoric acid in the solvent extractions stage. If desired the amount of magnesium oxide used in the high temperature hydrolysis step may exceed the amount required for neutralisation of di-2-ethylhexylphosphoric acid in which case the excess may be passed to the iron purge stage for neutralisation purposes.

It will be appreciated that the amount of magnesium oxide required for neutralisation of the cationic extractant is equivalent to the quantity of zinc extracted by the organic extractant phase in the solvent extraction stage.

In the high temperature hydrolysis stage any impurities which are not removed in the cementation stage and which would otherwise tend to build up in the circulating liquor do not hydrolyse with the magnesium chloride and will report with the magnesium oxide. Such impurities may be removed from the magnesium oxide by washing and thus purged from the system. For instance, any sulphate present will report as, for example, magnesium sulphate or sodium sulphate. These soluble sulphates can be washed from the magnesium oxide and purged from the system. Hence the spray roasting step, or other form of high temperature hydrolysis step, plays a very important part in purifying the circulating liquor.

The hydrogen chloride liberated in the high temperature hydrolysis step can be passed as such to the oxidative leach stage. Preferably, however, it is first dissolved in a suitable aqueous medium, e.g. raffinate from the solvent extraction stage. The spent wash water used to wash the zinc-loaded organic extractant phase can also be used for absorption of hydrogen chloride.

Although theoretically no magnesium is lost from the system, in practice some loss of magnesium with the residue from the oxidation leach stage is unavoidable. Accordingly it will usually be necessary to supply make up magnesium chloride to the system. Conveniently this is added to the primary filtrate from the oxidative leach stage prior to cementation. Part of the magnesium chloride may be made up by adding to the circuit magnesium carbonate or magnesium oxide and sodium chloride equivalent to the quantity of sulphate produced in the leach step. The sulphate ion, however produced, will result in a hydrogen ion imbalance in the circuit which may be used to solubilise the magnesium oxide or carbonate as follows:

$$2H^+ + MgO = Mg^2 + H_2O.$$

The sulphate ion will then be removed from the circuit in the spray roast section, as follows:

$$Mg^{2+} + SO_4^{2-} + 2Na^+ + 2Cl^- + H_2O = MgO + 2HCl + Na_2SO_4.$$

The sodium sulphate will be purged from the system with the wash liquor used to wash the magnesium oxide from the high temperature hydrolysis step and the HCl produced may be used to solubilise more magnesium oxide or carbonate.

In order that the invention may be clearly understood and readily carried into effect a preferred form of non-ferrous metal extraction plant embodying a preferred process according to the present invention will now be described, by way of example only, with reference to the accompanying diagrammatic drawing which is a flow sheet of the plant.

Figure 1:
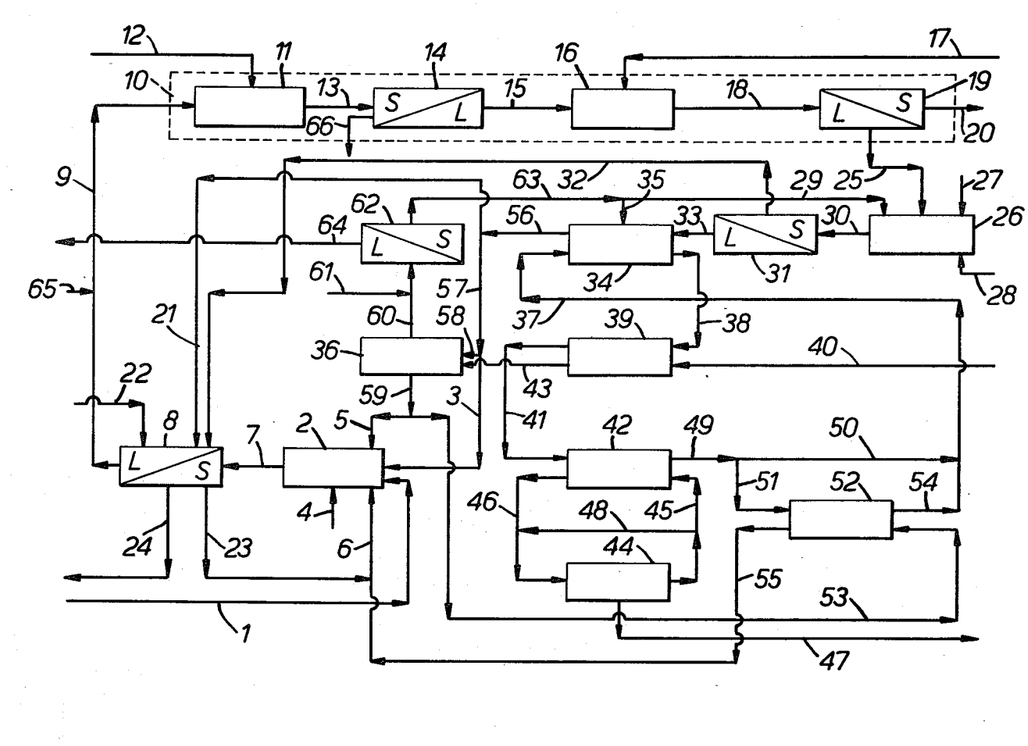

It will be appreciated by those skilled in the art that the flow sheet illustrates only the main process features of the plant and that many additional items of equipment, e.g. pumps, valves, holding tanks, pH measuring equipment, heaters, pressure control valves, temperature measurement equipment, and the like, will be required in an operational plant. Such items of equipments will be provided in accordance with convention chemical engineering practice and form no part of the present invention.

Referring to the drawing, a partially de-watered mud dredged from the bottom of the Red Sea is fed as a slurry in sea water containing about 14% by weight solids by way of line 1 to an oxidative leach stage 2 in the form of an autoclave which is fitted with a suitable stirrer. Recycled aqueous raffinate is fed in line 3 at a temperature of 40° C. to oxidative leach autoclave 2, to which oxygen is also supplied by way of line 4. This raffinate contains magnesium chloride and sodium chloride, together with a minor about of zinc chloride, but is otherwise essentially free from other metals. 18% w/v hydrochloric acid produced by spray roasting of part of the aqueous raffinate from the downstream metal recovery section is also supplied by line 5 to autoclave 2, whilst wash filtrate from the final residue solid-liquid separation step is recycled to the autoclave by way of line 6.

Typically, autoclave 2 and its contents are maintained at a temperature of 160° C. and at an oxygen partial pressure of 120 psig (828 kPag). The residence time in autoclave 2 is about 30 minutes.

In autoclave 2 the pressure leaching under oxidative conditions results in dissolution of silver, zinc, copper and gold from the Red Sea mud, leaving a residue comprising mainly elemental sulphur and iron in oxide and/or hydrated oxide form. This residue may further contain a minor amount of jarosite. By controlling the rate of supply of hydrochloric acid via line 5 to the autoclave 2 so as to approximate the leachable non-ferrous metal content of the mud supplied in line 1, the pH is maintained at about 0.5.

The resulting leached pulp is passed by way of line 7 to a filter press 8 by way of a thickener. Provision may be made for adding a flocculant to the pulp to facilitate subsequent solids/liquid separation.

From filter press 8 the primary filtrate or leach liquor, which has a pH of about 0.5, is fed in line 9 to the first stage of a metal recovery section. This first metal recovery stage comprises a cementation stage 10. Cementation is carried out in two steps. In the first cementation vessel 11 a quantity of zinc dust is added by way of line 12 equivalent to 1.5 times the stoichiometric amount required to precipitate the copper and silver content of the leach liquor. In the first cementation step the pH of the feed liquor is controlled within the range of from about 0.5 to about 1.0 and the temperature at about 40° C.

From first cementation vessel 11 the resulting pulp passes on by way of line 13 to a separation stage 14, consisting of a settling tank and a further filter press, the precious metal containing cementate, which contains substantially all the silver, gold and copper present in the leach liquor, being recovered as indicated by line 66. The liquor from separation stage 14, which now has a pH in the range of from about 0.5 to about 1.0, is passed by way of line 15 to a second cementation vessel 16, to which zinc dust is added by way of line 17, to precipitate the less noble non-ferrous metals present (e.g. Pb, Co, Cd, Ni, etc.). The amount of zinc dust added via line 17 is about 2.5 times the stoichiometric amount required to precipitate such less noble non-ferrous metals. The temperature in second cementation vessel 16 is about 80° C. and the pH is controlled in the range of from about 3.0 to about 4.0 or higher. The slurry formed in second cementation vessel 16 is passed on through line 18 to a further separation stage 19, also consisting of a settling tank and a filter press, the less noble non-ferrous metal concentrate being recovered by way of line 20.

The solids obtained by de-watering the leach pulp in filter press 8 are washed first with aqueous raffinate from the metal recovery section in line 21 and then with sea water supplied in line 22, the resultant washings being returned to autoclave 2 via lines 23 and 6, whilst the primary filtrate, as already mentioned, is recovered in line 9. The wash residue, which consists mainly of elemental sulphur and iron oxides and hydroxides, together with a minor amount of jarosite, is removed from filler press 8 as indicated by line 24 for neutralisation and disposal or alternatively for further treatment to recover residual gold.

The liquor, which contains iron in the ferrous state and zinc besides magnesium and sodium, but is now essentially free from dissolved copper, silver and gold, and other non-ferrous metals, passes from the settling tank of the second cementate separation stage 19 by way of line 25 to an iron removal stage 26 which comprises a pressure reactor. This is supplied with oxygen by way of line 27 to oxidise any ferrous iron present to the ferric state and with crushed limestone, dolomite or magnesite by way of line 28 to cause precipitation of ferric hydroxide. Optionally recycle magnesium hydroxide slurry can be fed to iron purge stage 26 by way of line 29 from the spray roaster, which is further described below.

Solution containing the iron hydroxide precipitate is pumped by way of line 30 to a solid/liquids separation stage 31. Conveniently solids/liquid separation stage 31 comprises a thickener. If desired, a flocculant may be added to the contents of thickener 31 to ensure precipitation of iron values. Thickened precipitate from thickener 31 is passed as shown by line 32 to filter press 8 and is combined with the leach residue from autoclave 2 and washed simultaneously therewith as previously described.

Liquor overflowing from thickener 31 contains primarily zinc chloride, in addition to the chlorides present in the circulating liquor as solubilising chlorides, i.e. magnesium chloride and sodium chloride. Such sodium chloride enter the circuit in the mud supplied in line 1. This liquor passes by way of line 33 to extraction section 34 of a single solvent cycle solvent extraction plant. Extraction section 34 is a three stage, continuous, counter-current extractive battery, each stage of which is a conventional mixer-settler. The incoming pregnant liquor is arranged to flow in counter-current to the solvent phase which is a solution containing, for example, 30% v/v di-2-ethyl-hexyl-phosphoric acid, 65% v/v kerosene, and 5% v/v iso-decanol. The overall aqueous: organic flow ratio is conveniently 2:1 by volume. Magnesium oxide supplied by way of line 35 from a spray roasting plant 36, which is described further below, is used to maintain the pH in the solvent extraction stages at about 2.0. When the magnesium salt of di-2-ethylhexyl-phosphoric acid is used for extraction the step of forming the magnesium salt of di-2-ethylhexyl-phosphoric acid is carried out in separate agitation tanks with an after-settler for separation of solvent phase and any aqueous phase or sludge. The solvent phase, containing the magnesium salt of the extraction agent, is pumped to the extractive battery from the after-settler. Recycled solvent phase, containing di-2-ethylhexyl-phosphoric acid as the free acid, is supplied to solvent extraction battery 34 in line 37.

Zinc-loaded solvent phase is passed via line 38 to a washing stage 39, which consists of mixer-settler units, in which the organic phase is scrubbed with water maintained at pH 3.0, supplied in line 40 in order to remove alkali metals and alkaline earth metals remaining in the organic phase, trace metals and entrained droplets of aqueous phase and thereby prevent contamination of the tank house feed in the subsequent electrolysis step which is described below. Washed solvent phase is pumped on from washing stage 39 in line 41 to strip stage 42, whilst effluent wash water from washing stage 39 is passed by way of line 43 to spray roaster 36 for absorption of hydrogen chloride, as will be described below.

In washing stage 39 the operating organic: aqueous phase ratio is 1:1 with an overall ratio of 10:1, i.e. there is recycle of wash water around the unit.

Solvent phase is stripped of zinc by contacting with a sulphuric acid-containing spent electrolyte, typically in a two stage, continuous, counter-current operation in strip stage 42. Again conventional mixer-settler units are used. The spent electrolyte is fed from a conventional zinc electro-winning plant 44 in line 45 to the strip stage 42. In strip stage 42 the aqueous:organic ratio is maintained at a value in the range of from about 2:1 to about 1:2, e.g. 1:1, by volume. Zinc-loaded strip liquor is recovered in line 46 and passed to tank house 44 for conventional electrolysis. Metallic cathodic zinc is recovered as shown by line 47. Part of this may be converted to dust for supply to the cementation stage in lines 12 and 17.

Reference numeral 48 indicates a tank house recycle line.

Stripped organic extractant phase is recovered from strip stage 42 in line 49 and can either be recycled to line 37 by way of line 50 or pass via line 51 to an acid wash stage 52 in which the organic extractant phase is washed with hydrochloric acid supplied via line 53 from the spray roaster 36. This acid washing step removes iron from the organic phase. The washed organic phase is recycled to solvent extraction stage 34 via lines 54 and 37. The hydrochloric acid used for washing is recycled to oxidative leach stage 2 in line 55.

Aqueous raffinate is recovered from solvent extraction stage 34 in line 56. Part of this raffinate is recycled via lines 57 and 3 to oxidative leach stage 2. Another part is passed via line 21, as previously described, to filter press 8 for washing of the oxidative leach residue.

Of the raffinate in line 57 only a part is passed on in line 3 to oxidative stage 2. The remainder is passed by way of line 58 to spray roaster 36.

Spray roaster 36 comprises a four stream spray roaster battery. The mechanism of the spray roasting process is one of high temperature hydrolysis:

$$MgCl_2 + H_2O = MgO + 2\ HCl.$$

Sodium chloride which also enters with the raffinate in line 58 does not react or degrade. Any sulphate present reports as sodium or magnesium sulphate in the solid magnesium oxide product. The hydrogen chloride produced is absorbed in the wash water in line 43 to form hydrochloric acid solution which is recovered in line 59, a part of which is passed by way of line 53 to acid wash stage 52, but the major part flows on in line 5 to oxidative leach stage 2.

The magnesium oxide product is recovered as indicated by line 60 and is re-slurried in sea water supplied by way of line 61. This slurry is held in slurry tanks for a sufficient period, e.g. a period of from about 30 minutes to about 8 hours, typically about 4 hours, in order to complete hydrolysis of magnesium oxide to magnesium hydroxide. From these slurry tanks the solids are pumped to a solid/liquid separation section and magnesia washing section indicated as 62. The resulting filter cake, which contains about 60 to about 65% w/w solids, is passed as indicated by line 63 to lines 35 and 29 for supply respectively to the iron purge stage 26 and to the solvent extraction stage 34. Washings from zone 62 are discarded by way of line 64 and provide a purge from the system for sodium chloride and for sulphate ions.

Make up amounts of magnesium chloride are supplied to the system by way of line 65.

The invention is further illustrated in the following Examples in which all percentages are by weight unless otherwise stated:

EXAMPLE 1

250 g of a 50% w/w (dry solids basis) slurry in sea water (specific gravity 1.057; dissolved solids content 7.89%) of a flotation concentrate obtained from a complex metal sulphide mud dredged from the bottom of the Red Sea were charged to an autoclave glass liner. There were then added 1000 g of lixiviant solution (specific gravity 1.18) containing 5.32 g/l HCl (i.e. an amount stoichiometrically equivalent to the combined zinc and copper content of the solids being leached), 160 g/l magnesium chloride (calculated as $MgCl_2$), and 45 g/l sodium chloride. The dried solids used in this Example had the following analysis: Zn, 29.47%; Cu, 3.47%; Fe, 16.21%; Ag, 0.0497%; Ni, 0.014%; Cd, 0.165%; Pb, 0.642%; Co, 0.095%; Au, 8 ppm. After filtration the dried solids were stored under nitrogen until used. After addition of lixiviant the autoclave was sealed and heated to 90° C. to destroy flotation reagents. The autoclave was then pressurised with oxygen to 120 psig (828 K Pag), purged to eliminate other gases, re-pressurised to 120 psig (828 k Pag) and heated to 160° C. The oxygen pressure was maintained by a direct connection to an oxygen supply with a control system set at the required pressure. Slurry samples were removed from the autoclave at intervals to monitor the progress of the reaction. These samples were filtered and the resulting filter cake was washed with 4 × 50 ml aliquots of 5 M Na Cl solution, followed by 2 × 100 ml aliquots of distilled water, and then dried. The primary filtrate, filter cake and washings were all retained for analysis. At the end of the test, i.e. after 60 minutes, the reactor was cooled rapidly to room temperature. The results obtained are set out in Table 1.

TABLE 1

| Time (mins) | % Dissolution | | | | | % Elimination Fe | Sulphate g/l | pH |
|---|---|---|---|---|---|---|---|---|
| | Zn | Cu | Ag | Au | Fe | | | |
| 15 | 100 | N.A. | N.A. | N.A. | 9.2 | — | 23.0 | 0.5 |
| 30 | 100 | 99.5 | 99.4 | N.A. | 9.2 | 90.8 | 23.8 | 0.4 |
| 60 | 99.9 | 99.8 | 99.2 | 79.0 | — | — | — | — |
| End of test mass balance % | 106.6 | 98.5 | 98.9 | 75.0 | — | 108.1 | — | — |

Notes to Table 1:
1. Intermediate Cu and Ag dissolution were calculated from intermediate sample analysis.
2. N.A. = not analysed.
3. Sulphate was formed by oxidation of sulphur.
4. Definition of terms:
(a) Metal dissolution at time, t =

$$\frac{\left(\text{End of test mass of metal in filtrate} \times \frac{\text{g/l metal sample at time t}}{\text{g/l metal sample at end of test}}\right)}{\text{Mass of metal in feed concentrate} \times \text{mass balance}} \times 100$$

(b) End of test metal dissolution =

$$\frac{\left(\text{Mass of metal in feed concentrate}\right) - \left(\text{Mass of metal in residue at end of test}\right)}{\text{Mass of metal in feed concentrate}} \times 100$$

(c) Mass balance =

$$\frac{\text{(Total mass of metal in products)}}{\text{(Total mass of metal in feed)}} \times 100$$

(d) Iron dissolution at time t =

$$\frac{\left(\text{End of test mass of iron in filtrate} \times \frac{\text{g/l iron in sample at time t}}{\text{g/l iron in sample at end of test}}\right)}{\text{Mass of iron in feed concentrate} \times \text{mass balance}} \times 100$$

(e) Iron elimination at 30 min =

$$\frac{\left(\text{Mass of iron in feed concentrate} - \text{mass of iron in filtrate at 30 min}\right)}{\text{Mass of iron in feed concentrate}} \times 100$$

(f) Gold dissolution =

$$\frac{\text{(Mass of gold in feed concentrate} - \text{Mass of gold in residue)}}{\text{Mass of gold in feed concentrate} \times \text{mass balance}} \times 100$$

5. Solution and water losses probably occurred during testing by evaporation during sampling and this undoubtedly affected the calculation of metal ion mass in solution.

EXAMPLE 2

The procedure of Example 1 was repeated using a different sample of solids obtained from Red Sea mud. This had the following analysis: Zn, 30.29%; Cu, 3.60%; Fe, 17.97%; Ag, 0.0493%,; Ni, 0.014%; Cd, 0.159%; Pb, 0.609%; Co, 0.0843%; Au, 8 ppm. The lixiviant (specific gravity, 1.189) contained 5.63 g/l HCl, 160 g/l magnesium chloride (calculated as Mg Cl$_2$), 45 g/l sodium chloride and 20 g/l sulphate ion (charged as sodium sulphate). The results are given in Table 2, to which Notes 2 to 5 under Table 1 also apply.

TABLE 2

| Time (mins) | % Dissolution | | | | | % Elimination Fe | Sulphate g/l | pH |
|---|---|---|---|---|---|---|---|---|
| | Zn | Cu | Ag | Au | Fe | | | |
| 15 | 95.5 | 95.5 | 90.8 | N.A. | 3.8 | — | 31.5 | 0.5 |
| 30 | 100 | 98.6 | 99.1 | N.A. | 4.0 | 96.0 | 32.8 | 0.3 |
| 60 | 99.9 | 98.6 | 99.1 | N.A. | — | — | — | — |
| End of test mass balance % | 96.1 | 97.5 | 99.6 | N.A. | — | 98.7 | — | — |

This Example shows, inter alia, that addition of sulphate suppresses sulphate oxidation.

added, corresponding to 1× stoichiometric quantity required to precipitate the Ag and Cu content of the leach filtrate. Samples of the solution and cementate were taken periodically during the course of the run, filtered and the solution analysed for the major components. At the end of the run the reactor contents were filtered and cementate analysed. The cementate was dried under oxygen-free nitrogen, dissolved in aqua regia and the solution filtered. The filter paper was thoroughly washed and the filtrate and washings bulked and analysed for the major components. The filter paper and undissolved material were ignited at 800° C. and the residue fused with potassium pyrosulphate in a platinum crucible and the fused material dissolved in dilute sulphuric acid. The resulting solution was also analysed. The results are given in Table 3.

TABLE 3

| Sample | Solution Composition (g/l) | | | | | | | | | | | eH (mV) |
|---|---|---|---|---|---|---|---|---|---|---|---|---|
| | Zn | Cu | Fe | Ag | Ni | Cd | Pb | Co | Au | SO$_4^{2-}$ | pH | |
| Feed | 36.8 | 4.5 | 0.94 | 0.063 | 0.019 | 0.205 | 0.805 | 0.108 | | | 0.50 | 765 |
| 10 min | 43.2 | 2.56 | 1.06 | 0.0005 | 0.019 | 0.173 | 0.822 | 0.109 | | | N.A. | N.A. |
| 20 min | 41.6 | 2.69 | 1.04 | 0.005 | 0.019 | 0.177 | 0.822 | 0.109 | | | N.A. | N.A. |
| 30 min | 42.0 | 2.84 | 1.06 | 0.0005 | 0.018 | 0.208 | 0.844 | 0.111 | | | N.A. | N.A. |
| 60 min | 42.0 | 3.43 | 1.10 | 0.0005 | 0.017 | 0.220 | 0.844 | 0.111 | | | N.A. | N.A. |
| Test End Filtrate | 40.8 | 3.12 | 0.98 | 0.001 | 0.017 | 0.209 | 0.800 | 0.111 | | | 1.00 | 540 |

| | Dry Salt Free Cementate Concentration % | | | | | | | | | |
|---|---|---|---|---|---|---|---|---|---|---|
| | Zn | Cu | Fe | Ag | Ni | Cd | Pb | Co | Au | SO$_4^{2-}$ |
| Test Residue | 3.23 | 98.63 | 0.105 | 4.177 | 0.223 | 0.131 | 1.80 | 0.023 | | |

EXAMPLE 4

The procedure of Example 3 is repeated using 609 g of a different leach filtrate. This time 4.57 g of zinc dust were added, corresponding to 2× stoichiometric quantity required to precipitate the Ag and Cu content of the leach filtrate. The results are summarised in Table 4.

TABLE 4

| Sample | Solution Composition (g/l) | | | | | | | | | | | eH (mV) |
|---|---|---|---|---|---|---|---|---|---|---|---|---|
| | Zn | Cu | Fe | Ag | Ni | Cd | Pb | Co | Au | SO$_4^{2-}$ | pH | |
| Feed | 37.0 | 4.40 | 1.44 | 0.060 | 0.018 | 0.205 | 0.805 | 0.098 | | | 0.55 | 785 |
| 10 min | 40.8 | 0.001 | 1.47 | 0.002 | 0.006 | 0.097 | 0.028 | 0.093 | | | 2.00 | N.A. |
| 20 min | 40.6 | 0.001 | 1.49 | 0.002 | 0.007 | 0.107 | 0.155 | 0.098 | | | 3.05 | N.A. |
| 30 min Test End Filtrate | 40.4 | 0.001 | 1.47 | 0.001 | 0.008 | 0.112 | 0.206 | 0.098 | | | 3.30 | 395 |

| | Dry Salt Free Cementate Concentration % | | | | | | | | | |
|---|---|---|---|---|---|---|---|---|---|---|
| | Zn | Cu | Fe | Ag | Ni | Cd | Pb | Co | Au | SO$_4^{2-}$ |
| Test Residue | 19.8 | 62.81 | 0.191 | 0.801 | 0.131 | 1.32 | 8.13 | 0.051 | | |

EXAMPLE 3

605 g of filtrate (specific gravity 1.210) from an oxidation leach run carried out on Red Sea mud solids by a procedure similar to that used in Example 1 were heated to 40° C. in a closed vessel and agitated at 400 rpm by a 4-bladed angled impeller. 2.34 g Zn dust (particle size in micrometers: 3.1%, −150 +106; 3.9%, −106 +95; 1.9%, −75 +63; 18.1%, −63 +45; 73.0%, −45) were

EXAMPLE 5

970 g of a solution (specific gravity, 1.220) containing the components listed below in Table 5 were treated at 80° C. following the procedure of Example 3 with addition of 5.16 g zinc duct (i.e. 2.5× stoichiometric quantity). The results are indicated in Table 5.

TABLE 5

| Sample | Solution Composition (g/l) | | | | | | | | | | | eH (mV) |
|---|---|---|---|---|---|---|---|---|---|---|---|---|
| | Zn | Cu | Fe | Ag | Ni | Cd | Pb | Co | Au | SO$_4^{2-}$ | pH | |
| Feed | 46.4 | 0.0021 | 1.84 | 0.001 | 0.0158 | 0.188 | 0.614 | 0.1064 | | | 0.85 | |
| 10 min | 48.4 | 0.0029 | 1.92 | N.A. | 0.0013 | 0.0012 | 0.0095 | 0.0596 | | | N.A. | |

TABLE 5-continued

| | | | | | | | | | | |
|---|---|---|---|---|---|---|---|---|---|---|
| 20 min | 49.2 | 0.0020 | 1.88 | N.A. | 0.0013 | 0.0012 | 0.0071 | 0.0436 | | N.A. |
| 30 min | 49.2 | 0.0012 | 1.74 | N.A. | 0.0013 | 0.0037 | 0.0071 | 0.0260 | | N.A. |
| Test End Filtrate | 49.2 | 0.0012 | 1.64 | Nil | 0.0012 | 0.0015 | 0.0095 | 0.0166 | | 4.7 | 500 |

| | Dry Salt Free Cementate Concentration % | | | | | | | | |
|---|---|---|---|---|---|---|---|---|---|
| | Zn | Cu | Fe | Ag | Ni | Cd | Pb | Co | Au | SO$_4^{2-}$ |
| Test Residue | 63.2 | 0.018 | 4.52 | 0.0014 | 0.25 | 2.92 | 9.05 | 0.0166 | | |

What is claimed is:

1. A process for recovering non-ferrous metal values from a metal-containing sulphide material containing at least one non-ferrous metal selected from zinc, copper, lead, cobalt, nickel, silver and gold, as well as iron comprising leaching the complex sulphide material under oxidising conditions in a leach stage with an acidic aqueous chloride lixiviant solution containing magnesium chloride, thereby to solubilise non-ferrous metal values in the material and to leave a residue comprising iron in oxide or hydrated oxide form and also sulphur, passing resulting non-ferrous metal-containing leach liquor to a metal recovery section including a solvent extraction stage in which non-ferrous metal values are recovered by liquid-liquid extraction using a hydrophobic organic extractant phase containing a cationic transport agent for non-ferrous metal transport, recovering from the solvent extraction stage an aqueous magnesium chloride-containing raffinate, subjecting a portion of the aqueous magnesium chloride-containing raffinate from the solvent extraction stage to high temperature hydrolysis, thereby liberating hydrogen chloride and magnesium oxide, recycling another portion of the aqueous magnesium chloride containing raffinate to the leach stage, recycling liberated hydrogen chloride to the leach stage, and passing magnesium oxide formed in the high temperature hydrolysis to the solvent extraction stage for use as neutralising agent for the cationic transport agent.

2. A process according to claim 1, in which the pH of the leach liquor from the oxidative leach step is controlled at a value below about 1.0.

3. A process according to claim 1, in which the concentration of chloride ion in the lixiviant ranges from about 2 gram ions per liter up to the solubility limit of chloride ions in the leach liquor under the selected operating conditions.

4. A process according to claim 3, in which the concentration of chloride ion ranges from about 4 to about 6 gram ions per liter.

5. A process according to claim 1, in which the oxidative leach step is conducted in the presence of molecular oxygen and at a partial pressure of oxygen in the range of from about 50 psig to about 250 psig (about 345 kPag to about 1725 kPag).

6. A process according to claim 1, in which the oxidative leach step is conducted at a temperature in the range of from about 50° C. to about 250° C.

7. A process according to claim 1, in which the lixiviant further contains at least one other metal chloride selected from zinc chloride, sodium chloride, potassium chloride, calcium chloride, and mixtures thereof.

8. A process according to claim 1, in which the lixiviant contains hydrochloric acid substantially equivalent to the non-ferrous metal content of the complex metal sulphide material.

9. A process according to claim 1, in which the metal recovery section includes, upstream from the solvent extraction stage, a cementation stage in which metallic zinc is added to the leach liquor from the leach stage to remove and recover metals which can be precipitated.

10. A process according to claim 9, in which cementation is effected in two or more steps, the first cementation step being carried out under conditions selected to yield a noble non-ferrous metal concentrate and the second and any subsequent cementation step being effected under conditions selected to yield a less noble non-ferrous metal concentrate.

11. A process according to claim 10, in which the first cementation step is carried out at a temperature in the range of from about 30° C. to about 50° C. and at a pH of less than about 1.0 by addition of zinc dust in an amount corresponding to from about 1 to about 2 times the stoichiometric quantity of zinc required to precipitate the noble non-ferrous metal values present in the liquor.

12. A process according to claim 10, in which the second cementation step is carried out at a temperature in the range of from about 50° C. to about 100° C. at a pH in the range of from about 3.0 to about 4.0 by addition of zinc dust in an amount corresponding to about 2.5 times the stoichiometric quantity of zinc required to precipitate the less noble non-ferrous metals present in the liquor.

13. A process according to claim 9, in which the metal recovery section includes, upstream from both the solvent extraction stage and the cementation stage, a carbon absorption stage for absorption of gold and silver from the liquor onto active carbon.

14. A process according to claim 9, in which the liquor is subjected to an iron removal step prior to or subsequent to said cementation stage.

15. A process according to claim 14, in which the iron removal step comprises the steps of oxidising substantially all iron salts present to ferric form and precipitating resulting ferric ions in oxide or hydrated oxide form.

16. A process according to claim 14, in which the iron removal step comprises a solvent extraction step for removal of iron values from the liquor.

17. A process according to claim 1, in which the solvent extraction stage comprises a solvent extraction stage for recovery of zinc values from the liquor in which the liquor is extracted with a liquid organic extractant phase comprising a cationic extractant for zinc, and in which zinc-loaded extractant phase is stripped with an aqueous sulphuric acid strip liquor.

18. A process according to claim 17, in which the pH of the aqueous solution in the solvent extraction stage is maintained in the range of from about 1.5 to about 4.0.

19. A process according to claim 17, in which the cationic extractant comprises a substituted phosphoric acid or a salt thereof.

20. A process according to claim 19, in which the substituted phosphoric acid is di-2-ethylhexylphosphoric acid.

21. A process according to claim 17, in which zinc-loaded extractant phase is washed with water maintained at a pH in the range of from about 2.5 to about 3.5 by addition of acid, prior to stripping.

22. A process according to claim 21, in which water used to wash to zinc-loaded extractant phase is used to absorb hydrogen chloride from the high temperature hydrolysis.

23. A process according to claim 17, in which stripped extractant phase is washed with hydro-chloric acid prior to recycle to the extraction stage.

24. A process according to claim 23, in which hydrochloric acid used to wash stripped extractant phase is recycled to the oxidative leach stage.

25. A process according to claim 17, in which the zinc-loaded strip liquor is subjected to electrolysis for the recovery of metallic zinc therefrom.

26. A process according to claim 25, in which the metal recovery section includes, upstream from the solvent extraction stage, a cementation stage in which metallic zinc from the electrolysis stage is added to the leach liquor from the leach stage to remove and recover metals which can be precipitated.

27. A process according to claim 1, in which the high temperature hydrolysis step comprises a spray roasting step.

28. A process according to claim 27, in which the aqueous raffinate from the solvent extraction step contains a mixture of magnesium, sodium, chloride, and sulphate ions and in which the spray roasting step produces, in addition to hydrogen chloride, a solid mixture comprising sodium chloride, sodium sulphate, magnesium sulphate, and magnesium oxide which is subsequently separated to give magnesium oxide and a sodium chloride and sulphate containing purge stream.

29. A process according to claim 28, in which magnesium chloride losses from the system are made up at least in part by adding magnesium oxide or magnesium carbonate and sodium chloride equivalent to the sulphate ion produced in the leach stage.

30. A process according to claim 29, in which hydrochloric acid produced in the spray roasting step and in an amount equivalent to the added sodium chloride is used to neutralise further magnesium oxide or carbonate thereby to provide magnesium chloride for make up purposes.

31. A process for recovering non-ferrous metal values from a metal-containing sulphide material containing at least one non-ferrous metal selected from zinc, copper, lead, cobalt, nickel, silver and gold, as well as iron comprising leaching the complex sulphide material under an oxygen partial pressure in the range of from about 50 psig to about 250 psig (about 345 kPag to about 1725 kPag) and at a temperature in the range of from about 50° C. to about 250° C. in a leach stage with an acidic aqueous chloride lixiviant solution containing magnesium chloride and having a chloride ion concentration of at least 2 gram ions per liter, thereby to solubilise non-ferrous metal values in the material and to leave a residue comprising iron in oxide or hydrated oxide form and also sulphur, controlling the pH of the leach liquor from the oxidative leach step at a value of between about 0.5 and about 2.5, passing resulting non-ferrous metal-containing leach liquor to a metal recovery section including one or more cementation stages and a solvent extraction stage in which non-ferrous metal values are recovered by liquid-liquid extraction from a zinc chloride-containing liquor at a pH in the range of from about 1.5 to about 4.0 using a hydrophobic organic extractant phase containing a magnesium salt of a cationic transport agent for zinc, recovering from the solvent extraction stage an aqueous magnesium chloride-containing raffinate and a zinc-loaded organic phase, subjecting a portion of the aqueous magnesium chloride-containing raffinate from the solvent extraction stage to high temperature hydrolysis, thereby liberating hydrogen chloride and magnesium oxide, recycling another portion of the aqueous magnesium chloride-containing raffinate to the leach stage, recycling liberated hydrogen chloride to the leach stage, passing magnesium oxide formed in the high temperature hydrolysis to the solvent extraction stage for use as neutralising agent for the cationic transport agent, subjecting zinc-loaded organic phase from the solvent extraction stage to stripping with an aqueous sulphuric acid strip liquor, electrolysing resulting zinc-loaded strip liquor, recovering resulting metallic zinc, and passing a part of the recovered metallic zinc to the cementation stage or stages.

* * * * *